United States Patent
Yeh et al.

(10) Patent No.: US 7,190,405 B2
(45) Date of Patent: Mar. 13, 2007

(54) METHOD AND APPARATUS OF ADAPTIVE DE-INTERLACING OF DYNAMIC IMAGE

(75) Inventors: Ting-Kun Yeh, Taipei (TW); Jackie Hsiung, Taipei (TW); Sheng-Che Tsao, Taipei (TW); An-Te Chiu, Taipei (TW)

(73) Assignee: Via Technologies, Inc. (TW)

( * ) Notice: Subject to any disclaimer, the term of this patent is extended or adjusted under 35 U.S.C. 154(b) by 493 days.

(21) Appl. No.: 10/851,241

(22) Filed: May 24, 2004

(65) Prior Publication Data

US 2004/0233329 A1    Nov. 25, 2004

(51) Int. Cl.
*H04N 7/01* (2006.01)
(52) U.S. Cl. ........................ 348/448; 348/452
(58) Field of Classification Search ............... 348/448, 348/441, 451, 452, 458, 459; H04N 7/01, H04N 11/20
See application file for complete search history.

(56) References Cited

U.S. PATENT DOCUMENTS

| | | | | |
|---|---|---|---|---|
| 6,108,047 A * | 8/2000 | Chen | ........................ | 348/448 |
| 6,330,032 B1 * | 12/2001 | Boehlke | ..................... | 348/452 |
| 7,057,665 B2 * | 6/2006 | Jung et al. | ................. | 348/452 |
| 7,129,987 B1 * | 10/2006 | Westwater | .................. | 348/441 |

* cited by examiner

*Primary Examiner*—Sherrie Hsia

(57) ABSTRACT

The present invention provides a method and apparatus of adaptive de-interlacing of dynamic image, in which extraction and calculation of motion vectors contained in a macro-block being processed, the value of calculation of motion vectors being then compared with a programmable threshold; wherein the macro-block being a motion block if the value of calculation being greater than the threshold and therefore Bob algorithm being chosen for de-interlacing process. Otherwise, the macro-block being a still block if the value of calculation being less than the threshold and therefore Weave algorithm being chosen for de-interlacing process. Consequently, the process is enforced continually and a dynamic image of high image quality is constituted with block as its unit.

14 Claims, 3 Drawing Sheets

| (0,0) | (0,-2) | (1,-3) | (2,5) |
|---|---|---|---|
| (-2,-4) | (-4,8) | (8,-10) | (-6,-2) |
| (-4,-2) | (18,-10) | (-10,-20) | (-16,30) |
| (-8,0) | (-4,4) | (-6,2) | (4,-5) |

FIG.2A

| 0 | 2 | 4 | 7 |
|---|---|---|---|
| 6 | 12 | 18 | 8 |
| 6 | 28 | 30 | 46 |
| 8 | 8 | 8 | 9 |

FIG.2B

Threshold=10

| W | W | W | W |
|---|---|---|---|
| W | B | B | W |
| W | B | B | B |
| W | W | W | W |

FIG.2C

METHOD AND APPARATUS OF ADAPTIVE DE-INTERLACING OF DYNAMIC IMAGE

BACKGROUND OF THE INVENTION

1. Field of the Invention

This present invention generally relates to a method and apparatus of de-interlacing of dynamic image, and more particularly to a method and apparatus of adaptive de-interlacing of dynamic image, in which calculation and determination in accordance with taking a block as a process unit of dynamic image are processed.

2. Description of the Prior Art

As digital products develop, it usually accompanies incompatible problems with analog products. There are two kinds of scanning standard of analog television at present, i.e. National Television System Committee (NTSC) and Phase Alternation by Line (PAL). Standard of NTSC is used in Japan or the US, according to which a frame is formed by 525 scanning lines i.e. 525 scanning lines are called a frame, which means the frame is displayed repeatedly at the speed of 30 frames per second. Yet 525 scanning lines that form a frame are not finished in only one scanning. The frame is displayed by scanning one line and then the line following the next line. In other words, after the first line is scanned, the third line is scanned rather than the second line, and then the fifth, seventh, to the $525^{th}$ line respectively. Then the scanning process returns to the second line and repeats, in the following are the fourth, sixth, eighth, etc. The formatting method of which is called "double-space scanning" or "interlacing". Therefore an interlaced video signal is composed of two fields, each of the two fields containing odd lines or even lines of the image. Since field of odd lines and field of even lines are formed by only half amount of scanning lines (262.5 lines), each field of odd lines and field of even lines only has half of the resolution the original image has. Each field of odd lines and field of even lines is displayed at the speed of 60 fields per second.

The advantage of interlacing scanning is that dynamic image is displayed smoothly, and the disadvantage is that the screen glitters. Thus, the disadvantages of "interlacing scanning" can be eliminated by a technique called "progressive scan". In progressive scan, the first, second, third, to the $525^{th}$ line are scanned in order and displayed at the speed of 60 frames per second. Therefore its scanning speed is twice the scanning speed of "interlacing" and the frame is displayed on the monitor with 525 scanning lines, which makes the frame fine and clear, which being the best merit of "progressive scan". Therefore, most of the developed video and audio at present has used this method for scanning and displaying. However, current video signal of NTSC system uses mainly the method of "interlacing" so far. Therefore, if a frame constituted by interlacing is displayed by a display system using a progressive scan: for instance, a DVD film edited by interlacing being directly broadcast and displayed on HDTV, only frame of odd lines and frame of even lines can be displayed and the resolution of image will be worse (that's because it only has half resolution of that). To solve this problem, the technique of "de-interlacing" should be used. In other words, de-interlacing is a method to convert interlacing to a progressive scan.

There are two basic algorithms to choose from in the technique of de-interlacing process, non-motion compensated and motion-compensated, wherein the non-motion compensated de-interlacing algorithm further comprising two basic linear transformation techniques, which are called Weave and Bob. To weave is two input fields overlaid or woven together to produce a progressive frame. While Bob only accepts one of the fields of input image (for example, image of even lines), and the other field (i.e. image of odd lines) is discarded, the vertical resolution of image will decrease from 720×486 to 720×243. The voids of the discarded lines are filled in by adjacent scanning lines in this image with only half of the resolution in order to regain the resolution of 720×486.

As regards the motion compensated de-interlacing algorithm, it comprises shifting pixels of two temporal shift fields to a common point in one instant and forming a frame, wherein detecting and determining of motion vectors can be used for cutting the fields into a plurality of macro blocks further and then executing by the procedure of block-matching. Moreover, when taking a macro block as detecting of motion vectors, it actually only chooses luminance block (i.e. Y block) of the macro block for executing and discarding saturation block (i.e. $C_r$ block and $C_b$ block). The main reason is that human's eyes are sensitive to the change of luminance and less sensitive to the change of saturation respectively. Therefore, in accordance with the requirement of reducing the processing amount of data, it only takes the luminance block as the basis of detecting of motion vectors when processing MPEG compression (or encoding).

Since current image capture system (for instance, a digital camera) adopts the method of interlacing scanning, thus DVD films edited by those images have to be broadcasted in the display device of interlacing for presenting higher resolution images. To eliminate the disadvantages of interlacing, we should choose a method of Weave or Bob for broadcast in order to convert interlacing scanning to progressive scan in a player device. However, to a dynamic image, when we choose the Weave method for broadcast, misalignment of image will occur since there is a temporal shift between images of odd lines and images of even lines. Therefore there will be serration or feathering and thus produces a blurred frame. To a still image, when we choose the Bob method for broadcast, although the misalignment of image will be overcome and a clear and natural dynamic image can be produced, but the vertical resolution of a still image will be sacrificed. It's therefore that, between current video/audio player system and digital display system, we cannot give consideration to the image quality of a frame with motion and a still frame when processing de-interlacing.

Besides, in the process of editing a VCD or DVD film, in accordance with some video/audio players using standard of Joint Photographic Experts Group (JPEG) or those films edited by using I-frame of MPEG compressing standard in one disc and films without compression, dynamic image might only include encoding information of I-frame or only include information of dynamic image, and thus cannot extract motion vectors of P-frame or B-frame of MPEG compression when playing such kind of film in the video/audio player system and therefore encoding incompatible problem occurs. Consequently, it cannot play such kind of film without motion vectors in the player system and it's not convenient for users.

SUMMARY OF THE INVENTION

The present invention provides a method of block-based adaptive de-interlacing of dynamic image, in which calculation and determination are processed directly by using motion vectors contained in block of image, wherein it takes a block as a process unit for de-interlacing of dynamic image. The method comprising steps of extracting and calculating all motion vectors contained in each macro-block of dynamic images; and then comparing the calculation results of motion vectors with a programmable threshold, wherein the macro-block being a motion block if the calculation result of motion vectors is essentially greater than the threshold and therefore Bob algorithm is chosen for de-interlacing process. Otherwise, the macro-block being a still block if the calculation result of motion vectors is essentially less than the threshold and therefore Weave algorithm is chosen for de-interlacing process. Consequently, the process is enforced continually and a dynamic image of high image quality is constituted with block as its process unit.

The present invention also provides an apparatus of adaptive de-interlacing of dynamic image comprising a processing unit of motion vectors for extracting and calculating of motion vectors contained in a block of image and then outputting a calculation value of motion vectors; a determining unit for receiving and comparing the calculation value of motion vectors with a threshold and then outputting information of determination; and a processing unit of video image for choosing an de-interlacing algorithm to constitute the dynamic image after receiving the information of determination.

As is described above, the method and apparatus of de-interlacing of dynamic image of the present invention can solve the problem. In which between current video/audio player system (for example, a DVD player) and digital display system (for example, HDTV or plasma TV), we can give consideration to the image quality of a frame with motion and a still frame when processing de-interlacing. Thus it can produce a higher-resolution image and satisfy the requirement of quality of audio/video player of users.

BRIEF DESCRIPTION OF THE DRAWING

FIG. 2 schematically shows the diagram of adaptive de-interlacing of the present invention.

DESCRIPTION OF THE PREFERRED EMBODIMENT

The complete process of MPEG compressing technique and method used in the present invention is not included in the following description. And the block diagrams in the following text are not made according to relative position in reality and complete connection diagram, the function of which is only to illustrate the features of the invention.

Figure 1:
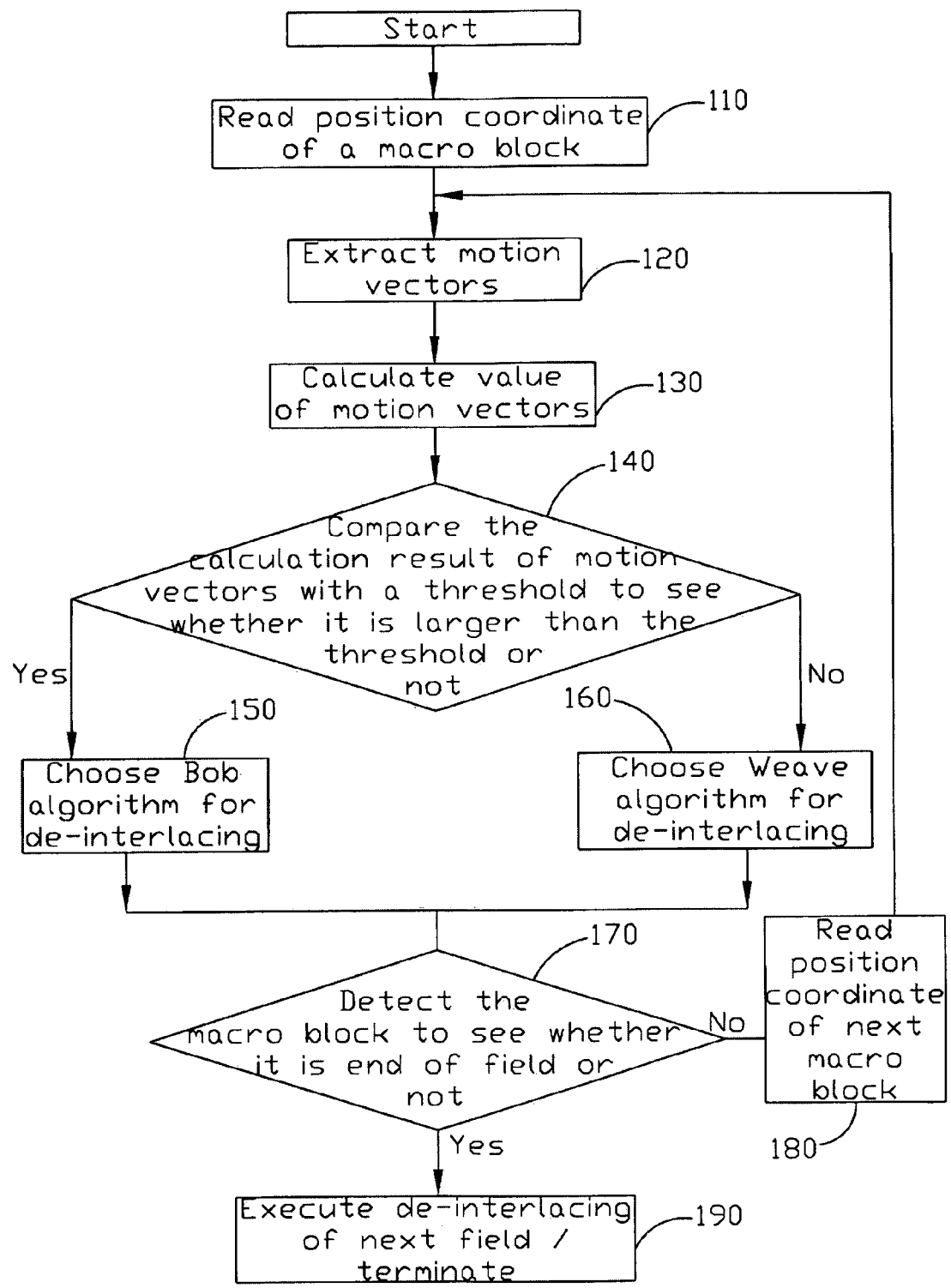
FIG. 1 schematically shows the flow chart of procedure of adaptive de-interlacing of the present invention.

FIG. 1 schematically shows the procedure flow chart of adaptive de-interlacing of the present invention. At first, reading the coordinates of a plurality of macro blocks of encoded image in step 110, and extracting motion vectors between different macro blocks in step 120, wherein the typical block size ranges from 8×8 pixels to 16×16 pixels generally. The block can be formed by other size of pixels, and it is adjusted in accordance with performance of the device executing de-interlacing and memory size provided. Since the value of motion vector records the displacement of a particular block between different fields at one time, thus the motion vector is shown as a specific coordinates value and for re-establishing a frame. After extracting motion vectors, then in step 130 calculating the calculation value of motion vector by adding the absolute value of coordinate value of X and Y of the motion vectors up respectively. For instance, value of the motion vector extracted is (0, −32) which indicates the block has no displacement in X-direction and has 32 pixels shifted downward in Y-direction, thus the calculation result is:

$$|0|+|-32|=32$$

In the following, comparing the calculation value of motion vector with a threshold, which is as shown in step 140, wherein the threshold is adjusted in accordance with requirement of image quality of films broadcast or performance of display system; in other words, the threshold is a programmable value. The macro-block is a motion block possessing displacement if the value of calculation is essentially greater than the threshold and therefore Bob algorithm is chosen for de-interlacing process, as shown in step 150. Otherwise, the macro-block is a still block without displacement if the value of calculation is essentially less than the threshold and therefore Weave algorithm is chosen for de-interlacing process, as shown in step 160. After determining the de-interlacing method of the block that has been read, then detecting the macro block whether it is end of a field, as shown in step 170. When the macro block is not the end of the field, then reading coordinate of the next macro block according to step 180 and repeating the steps described above. Otherwise, when the macro block is the end of the field, executing block-based adaptive de-interlacing of next field or stopping the procedure, as shown in step 190.

FIG. 2 further depicts the diagram of one embodiment of the method described above. And FIG. 2 schematically shows the diagram of procedure of adaptive de-interlacing of the present invention, comprising FIGS. 2A–2C. First, when dividing a field into 16 macro blocks and after processing by steps 110 and 120, the motion vectors extracted are: (0, 0), (0, −2), (1, −3), (2, 5), (−2, −4), (−4, 8), (8, −10), (−6, 2), (−4, −2), (18, −10), (−10, −20), (−16, −30), (−8, 0), (−4, 4), (−6, 2) and (4, −5) respectively, and the positions corresponding to the frame are as shown in FIG. 2A. Next, calculating them by step 130, adding after getting the absolute value of coordinate value of X and Y of motion vectors of each macro block respectively. And the value of motion vectors acquired are 0, 2, 4, 7, 6, 12, 18, 8, 6, 28, 30, 46, 8, 8, 8 and 9 respectively, and the positions corresponding to the frame are as shown in FIG. 2B. When the threshold is 10 and after processing by steps 140, 150 and 160, the frame constituted in accordance with adaptive de-interlacing of the present invention is shown in FIG. 2C; wherein B represents the frame processed by the Bob de-interlacing algorithm, and W represents the frame processed by the Weave de-interlacing algorithm.

Figure 3:
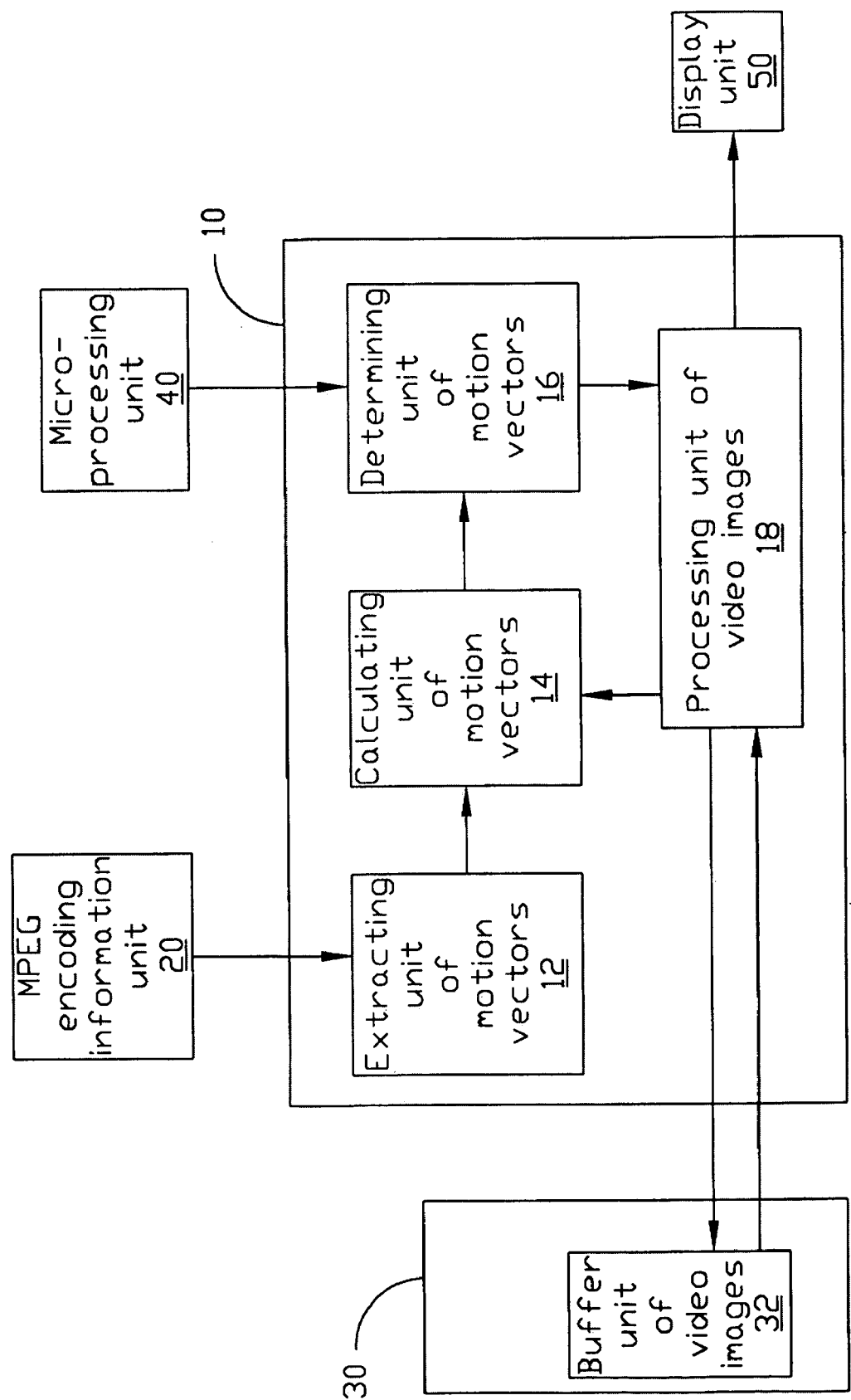
FIG. 3 schematically shows the block diagram of adaptive de-interlacing of the present invention.

In the following one embodiment of adaptive de-interlacing apparatus of the present invention is depicted. FIG. 3 schematically shows the block diagram of adaptive de-interlacing of the present invention, and the apparatus comprising a processing unit of de-interlacing 10 for connecting with a MPEG encoding information unit 20, a buffer unit of video images 32 within a memory unit 30, a micro-processing unit 40 and a display unit 50, and further comprising an extracting unit of motion vectors 12, a calculating unit of motion vectors 14, a determining unit of motion vectors 16 and a processing unit of video images 18. First, the extracting unit of motion vectors 12 within the processing unit of de-interlacing 10 reads encoding information from the MPEG encoding information unit 20 (for example, a DVD disc), then extracting the value of motion vectors of each macro block. Next, processing calculation by the calculating unit of motion vectors 14. And next, delivering the calculation result to the determining unit of motion vectors 16.

When the determining unit of motion vectors 16 receives the threshold delivered from the micro-processing unit 40, comparing the calculation value of motion vectors of each macro block with the threshold and then outputting the comparison result to the processing unit of video images 18. Next, when the processing unit of video images 18 receives the comparison result from the determining unit of motion vectors 16 and the result shows the calculation value of motion vectors is essentially greater than signal of the threshold (for example, signal of "1"), then delivering the image address of block required of executing de-interlacing to the buffer unit of video images 32. Moreover, contents of the image address contain encoding information of odd fields and even fields. After the buffer unit of video images 32 delivering image encoding information of each block address (which is from the memory unit 30) to the processing unit of video images 18 in sequence, then completing image de-interlacing of the block by Bob algorithm. And next, delivering the images already processed to the display unit 50 (for instance, HDTV, PDP or LCD TV) for displaying; in the meanwhile, the processing unit of video images 18 delivers one signal used to require that the calculating unit 14 deliver the calculation result of the next block.

On the other hand, when the processing unit of video images 18 receives the comparison result from the determining unit of motion vectors 16 and the result shows the calculation value of motion vectors is essentially less than signal of the threshold (for example, signal of "0"), then delivering the image address of block required of executing de-interlacing to the buffer unit of video images 32. After the buffer unit of video images 32 delivering image encoding information of each block address (which is from the memory unit 30) to the processing unit of video images 18 in sequence, then completing image de-interlacing of the block by Weave algorithm. And next, delivering the images already processed to the display unit 50 for displaying; in the meanwhile, the processing unit of video images 18 delivers one signal used to require that the calculating unit 14 deliver the calculation result of the next block. Besides, when the processing unit of video images 18 is executing the de-interlacing contiguously, detecting encoding information contiguously read from the extracting unit of motion vectors 12. When detecting that encoding information of the macro block contains an end of the field, executing de-interlacing process of the next field or stopping the procedure.

FIG. 3 schematically shows the block diagram of adaptive block-based de-interlacing of the present invention. Since size of pixels constituting the macro block is adjustable, FIG. 3 doesn't indicate that these units (except for MPEG encoding information unit 20 and the display unit 50, configured for input and output respectively) should be devices existing dependently although they are divided into different units. These units can also be configured and combined in accordance with interface format and requirement of products. For instance, when being used in the high-level image processing workstation or personal computer (PC) enabling broadcast of DVD films, the processing unit of de-interlacing 10 can be embedded in CPU of high-level system or be manufactured into a device (for instance, a chip) singly and then being connected to CPU. When being used in a player (for instance, a DVD player), the processing unit of de-interlacing 10, the memory unit 30 and the micro-processing unit can be integrated into a chip. As the development of manufacturing of semiconductor, SOC (i.e. System on a Chip) technique is well developed.

Therefore, the processing unit of de-interlacing of the present invention can also be integrated into different application system.

While this invention has been described with reference to illustrative embodiments, this description does not intend or construe in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method of adaptive de-interlacing of a dynamic image, comprising:
   extracting and calculating of a motion vector contained in a plurality of macro blocks of said dynamic image for acquiring a calculation value of said motion vector;
   comparing said calculation value of said motion vector with a programmable threshold for determining a de-interlacing algorithm; and
   executing said de-interlacing algorithm for constituting a de-interlaced dynamic image.

2. The method according to claim 1, wherein extracting of said motion vector can be extracted by P-frame and B-frame of MPEG compression technique.

3. The method according to claim 1, wherein calculating of said motion vector is taking sum of absolute value of coordinate value of X and Y of said motion vector extracted as said calculation value of said motion vector.

4. The method according to claim 1, wherein Bob algorithm is chosen for de-interlacing process of said dynamic image when said calculation value of said motion vector is essentially greater than said threshold.

5. The method according to claim 1, wherein Weave algorithm is chosen for de-interlacing process of said dynamic image when said calculation value of said motion vector is essentially less than said threshold.

6. The method according to claim 1, wherein said threshold can be adjusted by a control device and operation interface of a player.

7. A method of selecting a block-based adaptive de-interlacing algorithm of a dynamic image, comprising:
   reading coordinate of a plurality of macro blocks of said dynamic image, wherein said dynamic image is MPEG encoded;
   adding absolute value of coordinate value of X and Y of each coordinate of a plurality of macro blocks respectively in sequence for acquiring a calculation value of a motion vector; and
   comparing said calculation value of said motion vector with a programmable threshold for determining a de-interlacing algorithm for said dynamic image.

8. The method according to claim 7, wherein size of said macro block is a multiple of 8×8 pixels.

9. An apparatus of adaptive de-interlacing of a dynamic image, comprising:
   a processing unit of a motion vector for extracting and calculating of said motion vector contained in a plurality of macro-blocks, and then outputting a calculation value of said motion vector;
   a determining unit for receiving and comparing said calculation value of said motion vector with a programmable threshold, and then outputting an information of determination; and
   a processing unit of a video image for receiving and choosing a de-interlacing algorithm according to said information of determination.

10. The apparatus according to claim 9, wherein said processing unit of said motion vector further comprises:
   an extracting unit of said motion vector for extracting coordinates of said plurality of macro blocks as said motion vector; and
   a calculating unit of said motion vector for generating said calculation value of said motion vector according to said motion vector.

11. The apparatus according to claim 9, further comprising a micro-processing unit for providing said programmable threshold for said determining unit to receive and output an information of determination.

12. The apparatus according to claim 9, wherein Bob algorithm is chosen for de-interlacing process of said dynamic image when said calculation value of said motion vector is essentially greater than said threshold.

13. The apparatus according to claim 9, wherein Weave algorithm is chosen for de-interlacing process of said dynamic image when said calculation value of said motion vector is essentially less than said threshold.

14. The apparatus according to claim 9, wherein said processing unit of said video image comprises detecting said encoding information of said plurality of macro blocks read from said calculating unit of said motion vector whether it contains an end of a field or not for determining whether it enables executing said de-interlacing of next field or stopping the procedure of de-interlacing of said dynamic image.

* * * * *